US012718094B2

(12) United States Patent
Behpour et al.

(10) Patent No.: US 12,718,094 B2
(45) Date of Patent: Aug. 25, 2026

(54) SYSTEM AND METHOD FOR CONTINUAL REFINABLE NETWORK

(71) Applicant: Samsung Electronics Co., Ltd., Suwon-si (KR)

(72) Inventors: Sima Behpour, Sunnyvale, CA (US); Yilin Shen, Santa Clara, CA (US); Hongxia Jin, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 874 days.

(21) Appl. No.: 18/061,216

(22) Filed: Dec. 2, 2022

(65) Prior Publication Data

US 2023/0177332 A1 Jun. 8, 2023

Related U.S. Application Data

(60) Provisional application No. 63/286,458, filed on Dec. 6, 2021.

(51) Int. Cl.

| | |
|---|---|
| ***G06N 3/08*** | (2023.01) |
| ***G06N 3/045*** | (2023.01) |
| ***G06N 3/063*** | (2023.01) |
| ***G06N 3/084*** | (2023.01) |

(52) U.S. Cl.

CPC ............... *G06N 3/08* (2013.01); *G06N 3/045* (2023.01); *G06N 3/063* (2013.01); *G06N 3/084* (2013.01)

(58) Field of Classification Search

CPC .......... G06N 3/08; G06N 3/045; G06N 3/063; G06N 3/084

See application file for complete search history.

(56) References Cited

U.S. PATENT DOCUMENTS

| | | | | |
|---|---|---|---|---|
| 10,325,223 | B1 * | 6/2019 | Arel | G06N 3/0442 |
| 11,775,823 | B2 * | 10/2023 | Jakkam Reddi | G06N 3/084 706/12 |
| 11,922,316 | B2 * | 3/2024 | Tripathi | G06N 3/084 |

(Continued)

FOREIGN PATENT DOCUMENTS

| | | | |
|---|---|---|---|
| CN | 113657596 | A | 11/2021 |
| CN | 114861859 | A | 8/2022 |

OTHER PUBLICATIONS

Deng et al., Flattening Sharpness for Dynamic Gradient Projection Memory Benefits Continual Learning, Oct. 2021 (Year: 2021).*

(Continued)

*Primary Examiner* — Tamara T Kyle
*Assistant Examiner* — Jacqueline C. Meyer

(57) ABSTRACT

A method includes accessing, using at least one processor of an electronic device, a machine learning model. The machine learning model is trained by directing a gradient direction of gradients to one or more flat local minima and using a dynamic learning rate for one or more additional tasks. The method also includes receiving, using the at least one processor, an input from an input source. The method further includes providing, using the at least one processor, the input to the machine learning model. The method also includes receiving, using the at least one processor, an output from the machine learning model. In addition, the method includes instructing, using the at least one processor, at least one action based on the output from the machine learning model.

17 Claims, 6 Drawing Sheets

(56) References Cited

U.S. PATENT DOCUMENTS

| | | | | |
|---|---|---|---|---|
| 2020/0250483 | A1* | 8/2020 | Masse | G06N 3/04 |
| 2021/0034973 | A1 | 2/2021 | Xu et al. | |
| 2021/0256374 | A1 | 8/2021 | Hwang et al. | |
| 2021/0374542 | A1 | 12/2021 | Zhang et al. | |
| 2022/0230362 | A1 | 7/2022 | Jiang et al. | |

OTHER PUBLICATIONS

Mirzadeh et al., Understanding the Roll of Training Regimes in Continual Learning, Jun. 2020 (Year: 2020).*
Shi et al, Overcoming Catastrophic Forgetting in Incremental Few-Shot Learning by Finding Flat Minima, Nov. 2021 (Year: 2021).*
Ravaut et al., Gradient Descent Revisited via an Adaptive Online Learning Rate, Apr. 2018 (Year: 2018).*
Zhang et al., A Variance Principle Explains Why Dropout Finds Flatter Minima, Nov. 2021 (Year: 2021).*
Fong et al., Improving Layer-wise Adaptive Rate Methods using Trust Ratio Clipping, Nov. 2020 (Year: 2020).*
Ruder, An Overview of Gradient Descent Optimization Algorithms, Jun. 2017 (Year: 2017).*
Bengio et al., Curriculum Learning, 2009 (Year: 2009).*
Cai et al, Learning from Easy to Complex: Adaptive Multi-Curricula Learning for Neural Dialogue Generation, 2020 (Year: 2020).*
Kong et al., Adaptive Curriculum Learning, Oct. 2021 (Year: 2021).*

* cited by examiner

SYSTEM AND METHOD FOR CONTINUAL REFINABLE NETWORK

CROSS-REFERENCE TO RELATED APPLICATION AND PRIORITY CLAIM

This application claims priority under 35 U.S.C. § 119(e) to U.S. Provisional Patent Application No. 63/286,458 filed on Dec. 6, 2021, which is hereby incorporated by reference in its entirety.

TECHNICAL FIELD

This disclosure relates generally to machine learning systems. More specifically, this disclosure relates to a system and method for a continual refinable network.

BACKGROUND

Deep neural networks are achieving state-of-the-art performance across a variety of problem domains. An ideal objective is to achieve and keep this performance in a continual learning setting where the network receives tasks sequentially. However, some existing deep neural network model approaches train a specific neural network for every task, which leads to low generalization and high memory/storage and computational costs. The high memory/storage and computational costs make such models unfit for use on edge devices like smartphones or Internet of Things (IoT) devices. Also, some existing deep neural networks leverage a shared parameters space, but the shared parameters space gets overwritten with new learned parameters when new tasks are learned. This leads to a loss of learned parameters for previous tasks that causes the network to forget how to solve the previous tasks. This is known as catastrophic forgetting. The interference between the learning parameters of the old and new tasks and the contribution of this interference in the entire network structure can lead to catastrophic forgetting, which results in degradation of the performance of the network for every task.

SUMMARY

This disclosure relates to a system and method for a continual refinable network.

In a first embodiment, a method includes accessing, using at least one processor of an electronic device, a machine learning model. The machine learning model is trained by directing a gradient direction of gradients to one or more flat local minima and using a dynamic learning rate for one or more additional tasks. The method also includes receiving, using the at least one processor, an input from an input source. The method further includes providing, using the at least one processor, the input to the machine learning model. The method also includes receiving, using the at least one processor, an output from the machine learning model. In addition, the method includes instructing, using the at least one processor, at least one action based on the output from the machine learning model.

In a second embodiment, an apparatus includes at least one processing device configured to access a machine learning model. The machine learning model is trained by directing a gradient direction of gradients to one or more flat local minima and using a dynamic learning rate for one or more additional tasks. The at least one processing device is also configured to receive an input from an input source. The at least one processing device is further configured to provide the input to the machine learning model. The at least one processing device is also configured to receive an output from the machine learning model. In addition, the at least one processing device is configured to instruct at least one action based on the output from the machine learning model.

In a third embodiment, a non-transitory computer readable medium contains instructions that when executed cause at least one processor to access a machine learning model. The machine learning model is trained by directing a gradient direction of gradients to one or more flat local minima and using a dynamic learning rate for one or more additional tasks. The non-transitory computer readable medium also contains instructions that when executed cause the at least one processor to receive an input from an input source. The non-transitory computer readable medium further contains instructions that when executed cause the at least one processor to provide the input to the machine learning model. The non-transitory computer readable medium also contains instructions that when executed cause the at least one processor to receive an output from the machine learning model. In addition, the non-transitory computer readable medium contains instructions that when executed cause the at least one processor to instruct at least one action based on the output from the machine learning model.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include any other electronic devices now known or later developed.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
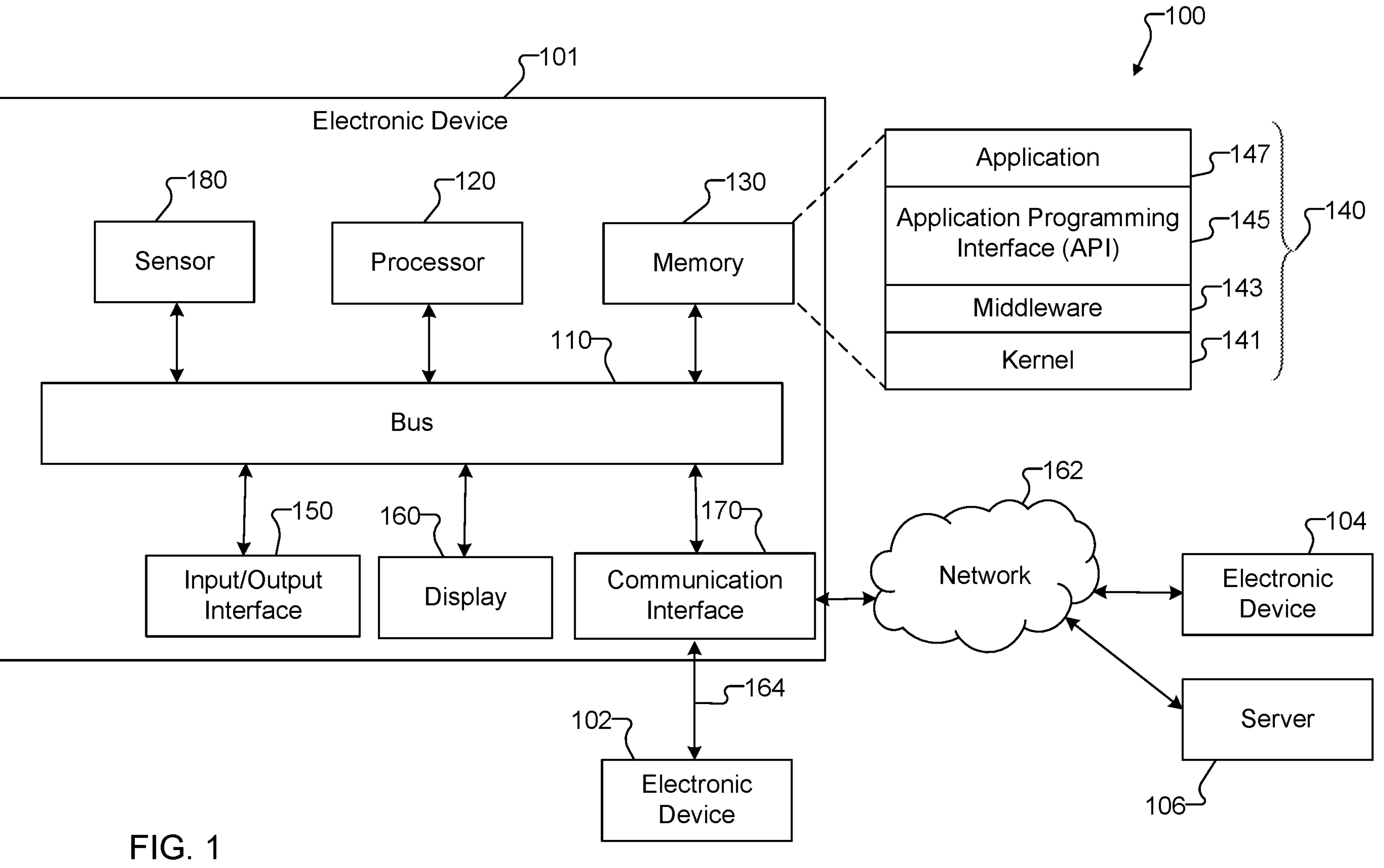
FIG. 1 illustrates an example network configuration including an electronic device in accordance with embodiments of this disclosure.

FIGS. 1 through 6, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, deep neural networks are achieving state-of-the-art performance across a variety of problem domains. An ideal objective is to achieve and keep this performance in a continual learning setting where the network receives tasks sequentially. However, some existing deep neural network model approaches train a specific neural network for every task, which leads to low generalization and high memory/storage and computational costs. The high memory/storage and computational costs make such models unfit for use on edge devices like smartphones or Internet of Things (IoT) devices. Also, some existing deep neural networks leverage a shared parameters space, but the shared parameters space gets overwritten with new learned parameters when new tasks are learned. This leads to a loss of learned parameters for previous tasks that causes the network to forget how to solve the previous tasks. This is known as catastrophic forgetting. The interference between the learning parameters of the old and new tasks and the contribution of this interference in the entire network structure can lead to catastrophic forgetting, which results in degradation of the performance of the network for every task.

This disclosure proposes an intelligent strategy to alleviate interference and mitigate or resolve these and other problems. This disclosure provides for machine learning models with layers of shared parameters using a novel approach for continual learning, referred to as a continual refinable network (CRN). The CRN directs sequential and new task convergence to flat local minima, avoiding convergence to sharp local minima that can cause catastrophic forgetting. The CRN can also dynamically refine the weights of the network layers as the network is trained on a sequence of tasks to learn a compact overlapping knowledge sharing structure among tasks.

The catastrophic forgetting problem is related to interference among the task learning parameters and a stability-plasticity dilemma. That is, neural networks require plasticity to learn new knowledge while also requiring stability to prevent forgetting acquired knowledge. High plasticity and low stability result in learning new tasks fast but forgetting previous tasks, which leads to catastrophic forgetting. Maintaining a suitable trade-off between stability and plasticity is thus a useful or important characteristic of an incremental learning system.

Some networks leverage a "dropout" gating technique or a dynamic path selection approach like RPS-Net to achieve a stability-plasticity trade-off. However, such approaches can have various drawbacks. For example, the dropout technique randomly drops or omits a portion of the feature detectors (hidden units or neurons) on each training process. However, using a gating mechanism (such as dropout) to randomly discard learned parameters causes a degradation in interference accuracy because the random dropping of parameters results in losing important learned information. Embodiments of this disclosure solve this problem by using a gating mechanism based on a dynamic learning rate and new task gradient updates that causes neurons to become active or inactive but does not discard neurons such as with other approaches like dropout. The CRN of embodiments of this disclosure also provides superior performance over existing approaches while requiring much lower time and memory complexity costs.

FIG. 1 illustrates an example network configuration 100 including an electronic device in accordance with embodiments of this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described below, the processor 120 may receive and process input(s) (such as audio inputs or data received from an audio input device like a microphone, image inputs, text inputs, or other input types), provide the input(s) to a machine learning model configured to perform and learn a plurality of tasks based on the input(s), and instruct at least one action based on the input(s) and output(s) from the machine learning model. The processor 120 may also instruct one or more other devices to perform one or more operations (such as outputting audio using an audio output device like a speaker) or display content on one or more displays 160. The processor 120 may further continually train machine learning models on new tasks, such as directing gradients associated with a task to converge to one or more flat local minima using a ratio of shared learning parameters to the task gradients and modifying a dynamic learning rate based on the shared learning parameters and task gradient updates.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted as an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications supporting the receipt of inputs for a machine learning task, performing continual learning operations for the task including directing gradients associated with a task to converge to one or more flat local minima using a ratio of shared learning parameters to the task gradients and modifying a dynamic learning rate based on the shared learning parameters and task gradient update, outputting task results, and executing actions related to the output results. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may receive and process input(s) (such as audio inputs or data received from an audio input device like a microphone, image inputs, text inputs, or other input types), provide the input(s) to a machine learning model configured to perform and learn a plurality of tasks based on the input(s), and instruct at least one action based on the input(s) and output(s) from the machine learning model. The server 106 may also instruct one or more other devices to perform one or more operations (such as outputting audio using an audio output device like a speaker) or display content on one or more displays 160. The server 106 may further continually train machine learning models on new tasks, such as directing gradients associated with a task to converge to one or more flat local minima using a ratio of shared learning parameters to the task gradients and modifying a dynamic learning rate based on the shared learning parameters and task gradient updates.

Although FIG. 1 illustrates one example of a network configuration 100 including an electronic device 101, various changes may be made to FIG. 1. For example, the network configuration 100 could include any suitable number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
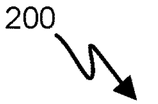
FIG. 2 illustrates an example continual refinable machine learning system in accordance with embodiments of this disclosure.
Figure 2:
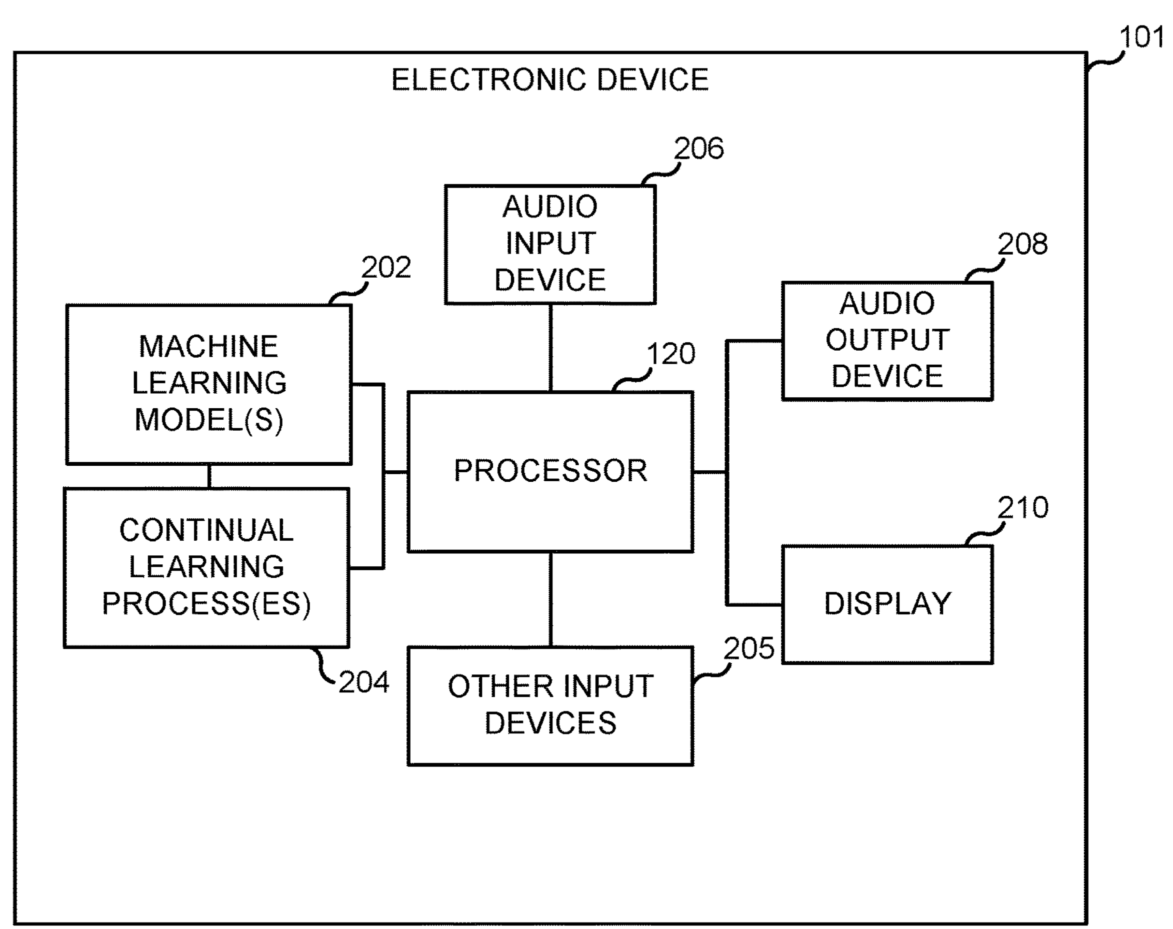

FIG. 2 illustrates an example continual refinable machine learning system 200 in accordance with embodiments of this disclosure. For ease of explanation, the system 200 is described as involving the use of the electronic device 101 in the network configuration 100 of FIG. 1. However, the system 200 may be used with any other suitable electronic device(s), such as the server 106, and in any other suitable system(s).

As shown in FIG. 2, the system 200 includes the electronic device 101, which includes the processor 120. The processor 120 is operatively coupled to or otherwise configured to use one or more machine learning models 202 for performing various tasks, such as speech recognition and voice assistant services, text-based assistant services, image feature and object detection and/or classification, or other tasks. The machine learning model 202 is a continual refinable network (CRN) that is continuously trained to perform related tasks using one or more continual learning processes 204 as described in the various embodiments of this disclosure. The machine learning model 202 can be a deep neural network including L layers and shared learning parameters $\theta$, which can be initialized with random values. The machine learning model 202 learns/updates the model parameters $\theta$ at a time t when a new task is received. The machine learning model 202 is updated for new tasks by refining a learning space in a continual learning setting, directing an optimization algorithm (such as a stochastic gradient descent (SGD)) to flat local minima, and updating learning parameters of the network for training new tasks by modifying a dynamic learning rate (such as in a layer-wise or element-wise fashion), rather than randomly as in inferior techniques like dropout techniques.

The system 200 also includes an audio input device 206 (such as a microphone), an audio output device 208 (such as a speaker or headphones), other input devices 205 (such as a keyboard, mouse, or touch screen), and a display 210 (such as a screen or a monitor like the display 160). For example, the processor 120 can receive an audio input from the audio input device 206 and provide the audio input to the machine learning model 202, where the machine learning model 202 is used for performing voice recognition and voice assistant services. As a particular example, assume an utterance is received from a user via the audio input device 206 including a wake word or phrase (such as "hey BIXBY, play a song by X"). Here, the machine learning model 202 can detect the presence of a wake word "BIXBY" or phrase "hey, BIXBY" and provide an output regarding an action to perform based on the utterance, and the processor 120 can instruct the audio output device 208 to begin playing a song by X.

In accordance with embodiments of this disclosure, the same machine learning model 202 could be updated using the continual learning process(es) 204 to perform a new subsequent task, such as a task related to the types of tasks the machine learning model 202 is designed to perform. For example, if the machine learning model 202 that performed the above example regarding playing a song instead receives a text input in a text box using a physical or virtual keyboard (such as "Hi Jack"), the machine learning model 202 may provide a predicted next portion of the text that is output by the processor 120 to the display 210 (such as "how can I help you?"). The machine learning model 202 can be used by the processor 120 to instruct various such actions of the electronic device 101 to service various user requests, such as causing a phone application or other communication application to begin a communication session with a contact stored on the electronic device 101, starting a timer, performing a web search, etc.

As another example, the machine learning model 202 can be configured to perform image/object detection and classification tasks and can be continuously updated to detect and classify various related objects. For example, the machine learning model 202 may be trained on a first task using the continual learning process(es) 204 of this disclosure to detect that an image includes a dog, then trained on a subsequent task to detect that an image includes a cat, then trained on a subsequent task to detect that an image includes a lion, and then trained on a subsequent task to detect that an image includes a tiger. The machine learning model 202 updated using the continual learning process(es) 204 described in this disclosure allows the machine learning model 202 to retain knowledge of early tasks (such as classifying images into a "dog" or "cat" category) while being able to learn new tasks (such as classifying images into new "lion" or "tiger" categories).

Although FIG. 2 illustrates one example of a continual refinable machine learning system 200, various changes may be made to FIG. 2. For example, the audio input device 206, the audio output device 208, and the display 210 can be connected to the processor 120 within the electronic device 101, such as via wired connections or circuitry. In other embodiments, the audio input device 206, the audio output device 208, and the display 210 can be external to the electronic device 101 and connected via wired or wireless connections. Also, in some cases, the machine learning model(s) 202 can include multiple CRN models that are each configured to perform continuous learning on separate related subsets of tasks (such as one model for learning tasks related to image classification and one model for learning tasks related to device assistant services), and the multiple models can be stored as separate models called upon by the processor 120 to perform the tasks. Further, in some embodiments, the machine learning model(s) 202 can be stored remotely from the electronic device 101, such as on the server 106. Here, the electronic device 101 can transmit requests including inputs (such as captured audio or image data) to the server 106 for processing of the inputs using the machine learning model(s) 202, and the results can be transmitted back to the electronic device 101.

Figure 3:
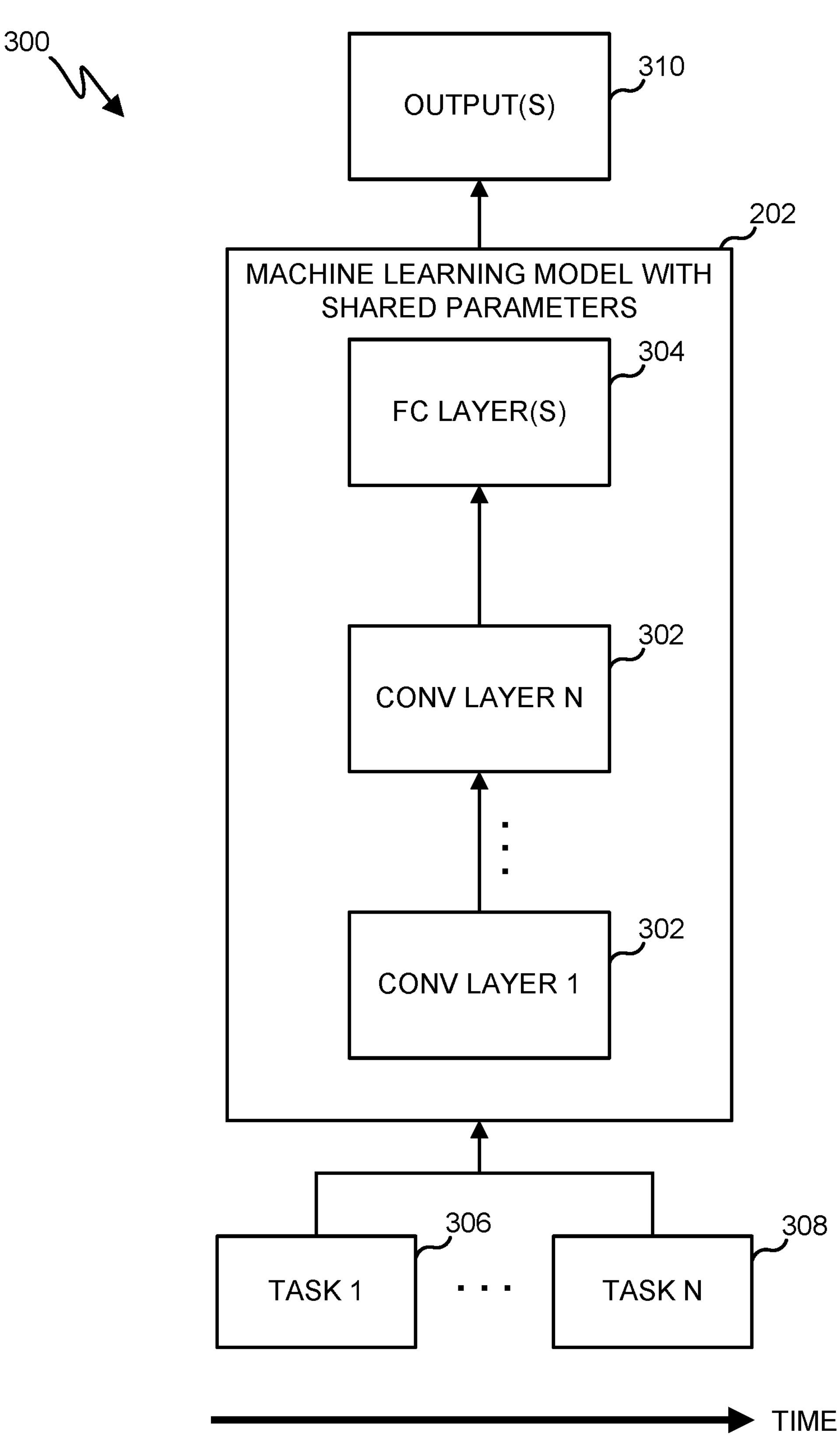
FIG. 3 illustrates an example continual refinable network architecture in accordance with embodiments of this disclosure.

FIG. 3 illustrates an example continual refinable network architecture 300 in accordance with embodiments of this disclosure. For ease of explanation, the architecture 300 is described as involving the use of the electronic device 101 in the network configuration 100 of FIG. 1. However, the architecture 300 may be used with any other suitable electronic device (such as the server 106) or a combination of devices (such as the electronic device 101 and the server 106) and in any other suitable system(s).

As shown in FIG. 3, the architecture 300 includes the machine learning model 202, which is described above with respect to FIG. 2. The machine learning model 202 includes L layers of shared learning parameters θ, which can be initialized with random values. In this example, the layers of the machine learning model 202 can include one or more convolutional layers 302 and one or more fully-connected layers 304. The machine learning model 202 learns/updates the model parameters θ at a time t when a first task 306 is received and subsequently at a time t+x when each new task is received for n number of tasks 308. As described in this disclosure, the machine learning model 202 is updated for new tasks by refining a learning space in a continual learning setting, directing an optimization algorithm (such as SGD) to flat local minima, and updating learning parameters of the network for training new tasks by modifying a dynamic learning rate (such as in a layer-wise or element-wise fashion), rather than randomly as in inferior techniques like dropout techniques. For each new task learned and processed, the machine learning model 202 provides one or more outputs based on the type of task.

As an example, the machine learning model 202 can be configured to perform image/object detection and classification tasks and can be continuously updated as new tasks are received to detect and classify various new object types. For instance, the machine learning model 202 may be trained on a first task using the continual learning process(es) 204 of this disclosure to detect that an image includes a dog, then trained on a subsequent task to detect that an image includes a cat, then trained on a subsequent task to detect that an image includes a lion, then trained on a subsequent task to detect that an image includes a tiger, and so on. The machine learning model 202 updated using the continual learning processes described in this disclosure allows the machine learning model 202 to retain knowledge of early tasks (such as classifying images into a "dog" or "cat" category) while being able to learn new tasks (such as classifying images into new "lion" or "tiger" categories).

Although FIG. 3 illustrates one example of a continual refinable network architecture 300, various changes may be made to FIG. 3. For example, various components and functions in FIG. 3 may be combined, further subdivided, replicated, or rearranged according to particular needs. Also, one or more additional components and functions may be included if needed or desired. Additionally, the machine learning model 202 may not be a convolutional neural network as shown in the example of FIG. 3 but may be of other neural network types, such as a feed forward neural network, a multilayer perceptron, a recurrent neural network, and long short-term memory (LSTM) network, etc.

Figure 4:
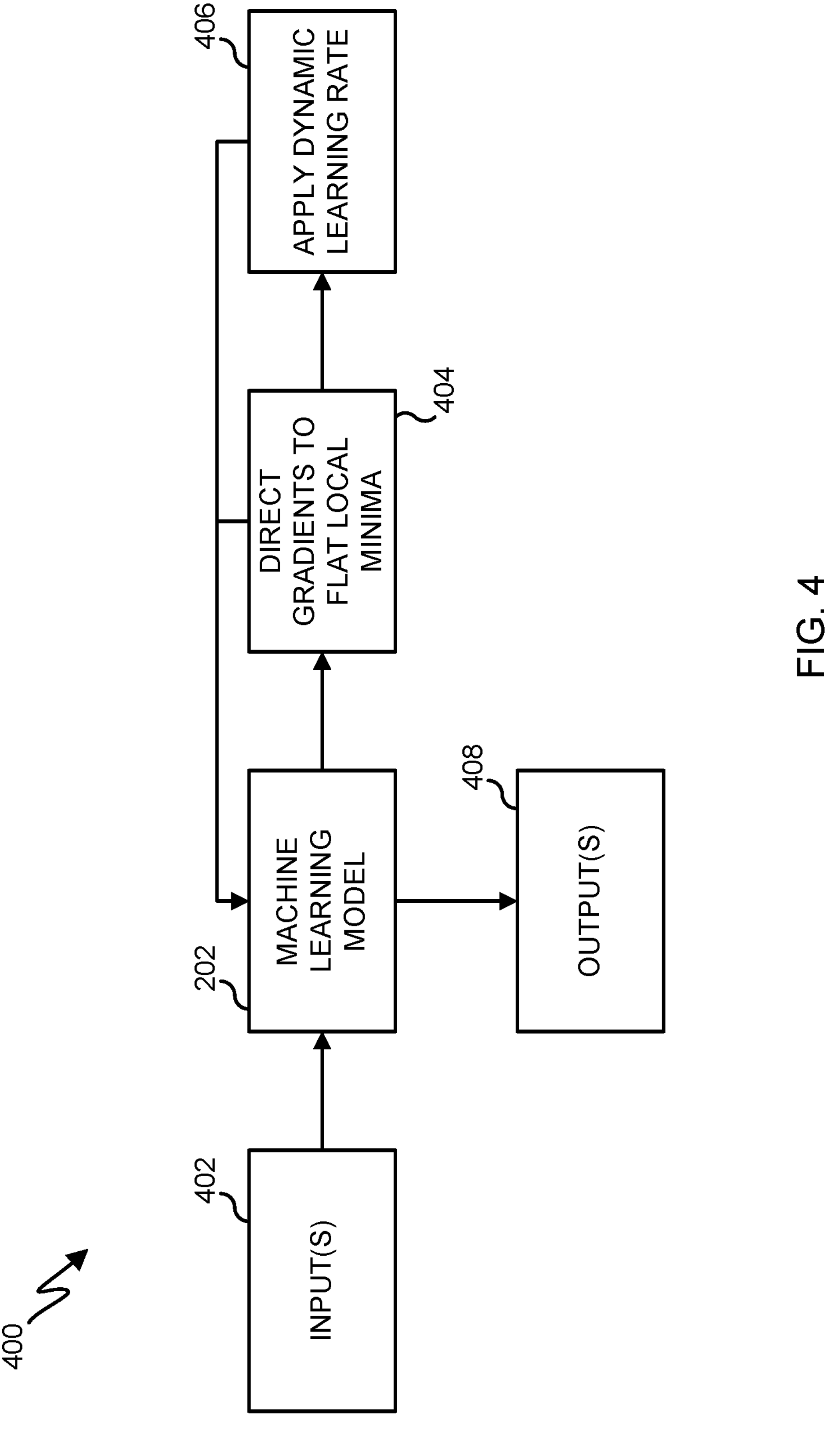
FIG. 4 illustrates an example continuous learning process in accordance with embodiments of this disclosure.

FIG. 4 illustrates an example continuous learning process 400 in accordance with embodiments of this disclosure. For ease of explanation, the process 400 is described as involving the use of the electronic device 101 in the network configuration 100 of FIG. 1. However, the process 400 may be used with any other suitable electronic device (such as the server 106) or a combination of devices (such as the electronic device 101 and the server 106) and in any other suitable system(s).

As shown in FIG. 4, inputs 402 are provided to a machine learning model 202. The inputs 402 are associated with a task to be performed by the machine learning model 202, and the task can be a task previously learned by the machine learning model 202 or a completely new task to be learned by the machine learning model 202. The machine learning model 202 can be the machine learning model as described with respect to FIGS. 2 and 3. In general continual learning settings, tasks {T1, T2, T3, . . . , Tn} arrive sequentially. Training data is presented for every task as $$D_t = \{x_i, y_i\}_{i=1}^{N_t},$$

where Nt represents the number of training data for task t, $y \in \{0, 1\}$, and $x \in R^d$. For example, for a k-class classification, y is a k-dimensional one hot vector. It is notable that, with existing models (such as a classifier) trained on task $T_i \leq i \leq n$, any data from previous tasks $\{T_m | m<i\}$ is not accessible.

The machine learning model 202 of this disclosure includes L layers of shared learning parameters θ, which can be initialized with random values. The machine learning model 202 learns/updates the model parameters θ at a time t when inputs related to a task are received and subsequently when each new task is received, which can occur for any number of tasks. The continual learning processes of this disclosure protect network learning parameters from interference by (i) leveraging a dynamic adaptive learning rate in a gradient optimization to control the interference among the parameters (activation/deactivation of neurons) and (ii) modifying the learning rate by considering the current gradient update and the current learning parameters of the network layer-wise in some embodiments or element-wise in some embodiments. One purpose of refining the network of the machine learning model 202 is finding and updating a set of learning parameters that share knowledge (network weights) through the network that is beneficial for all tasks in a continual learning scenario. The process 400 directs the convergence of sequential tasks towards the one or more flat local minima. Moreover, the process 400 dynamically refines the weights of the network layers as it trains on a sequence of tasks to learn a compact overlapping knowledge sharing structure among tasks.

Figure 5:
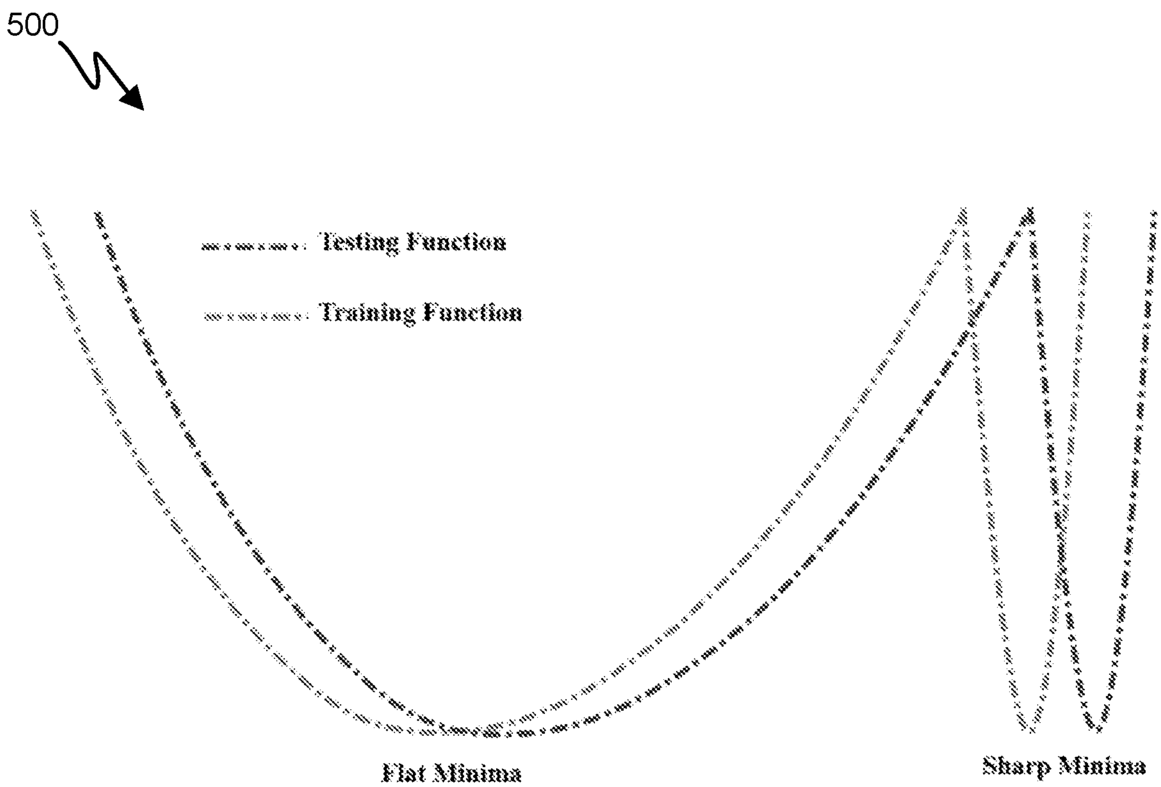
FIG. 5 illustrates an example local minima graph in accordance with embodiments of this disclosure.

At step 404 of the process 400, the machine learning model 202 is updated for a new task associated with the inputs 402 by refining a learning space in a continual learning setting and directing an optimization function (such as SGD) to flat local minima. Convergence of new tasks to sharp local minima can problematically cause low generalization and catastrophic forgetting. For example, FIG. 5 illustrates an example local minima graph 500 in accordance with embodiments of this disclosure. In FIG. 5, the x-axis represents the learning parameters, and the y-axis represents the value of the loss function. FIG. 5 illustrates a gap between training and testing phases for flat and sharp local minima in single-task learning.

As shown in FIG. 5, both flat and sharp local minima present a minimum loss value but provide a different generalization. Comparing the training curves and the testing curves, the flat minima provide a tighter gap (better generalization) while the sharp minima are loose. A flat minimizer (learning parameter) $\overline{\theta}$ causes an optimization function to vary slowly in a relatively large neighborhood of $\overline{\theta}$, leading to low sensitivity. For a sharp minimizer $\hat{\theta}$, the optimization function decreases rapidly in a small neighborhood of $\hat{\theta}$, resulting in high sensitivity. Learning systems that find sharp local minima lead to poor generalization. However, low sensitivity of the training function at a flat minimizer positively increases the ability of the trained model to generalize on new data.

In various embodiments, convergence to flat minima can be guaranteed for the first task by leveraging an optimization function such as SGD as the optimizer in a continual-learning setting. Using SGD, the gradient update rule can be defined as $\theta=\theta-ng(\theta)$, where n represents the learning rate, $\theta$ represents the learning parameter, and $g(\theta)$ denotes the gradient of an objective function with respect to the learning parameter $\theta$. Based on the optimization formulation of $\theta=\theta-ng(\theta)$, the three variables $\theta$, n, and $g(\theta)$ are main elements that can be used to monitor and control the behavior of the network. However, $g(\theta)$ cannot typically be controlled since it is computed based on the loss and during the backpropagation phase. Therefore, in embodiments of this disclosure, the processor 120 adjusts the learning rate n to apply a dynamic learning rate to control the update rate of the learning parameters. The new task gradient updates and the neural network learning parameters are two parameters that change dynamically according to embodiments of this disclosure.

Referring again to FIG. 4, at step 404 of the process 400, the processor 120 directs the convergence of sequential tasks towards the one or more flat local minima. For example, the SGD gradient update rule may be as shown in Equation (1) below for the machine learning model 202 after being trained on a first task $T_i$ and launching to train a next task $T_{i+1}$.

$$\theta_{sh}=\theta_{sh}-ng(\theta_{sh},T_{i+1}) \tag{1}$$

The shared learning parameters $\theta_{sh}$ can thus be updated by the gradients of the new task $T_{i+1}$. However, the gradient $g(\theta_{sh}, T_{i+1})$ may become too large when the machine learning model 202 receives a totally new task to learn, which can cause the shared learning parameters $\theta_{sh}$ to be updated sharply in an incorrect direction for previously learned tasks. Therefore, to direct the gradients to the one or more flat local minima, a ratio (r) between the weights (current learning parameters) and the new task gradient updates can be used, such as is shown in Equation (2) below.

$$r=\frac{\|\theta_{sh}^{h}\|}{\|g(\theta_{sh}^{h},T_{i+1})\|} \tag{2}$$

Here, the magnitude of the current learning parameters is $\|\theta\|$, and the magnitude of the gradient updates is $\|g(\theta)\|$. Because the ratio r can be different over different layers of the machine learning model 202 and over the different tasks, the learning parameters are updated based on the changes between layers and tasks as defined by the ratio.

At step 406 of the process 400, shared learning parameters of the machine learning model 202 are updated by modifying a dynamic learning rate, such as in a layer-wise or element-wise fashion. The learning rate of the optimization function can be modified by considering the two dynamic main factors of the optimization function, the shared learning parameters ($\theta_{sh}$), and the gradients of the new task ($g(\theta)$), in a layer-wise or element-wise manner by using the ratio of Equation (2) in the optimization function, such as is shown below in Equation (3).

$$\theta_{sh}=\theta_{sh}-n\frac{\|\theta_{sh}^{h}\|}{\|g(\theta_{sh}^{h},T_{i+1})\|}g(\theta_{sh},T_{i+1}) \tag{3}$$

Here, $\|\cdot\|$ represents the L2 norm. In embodiments in which parameters are updated layer-wise, h denotes the neural network layer ($1\leq h\leq L$ for a network with L layers). In embodiments in which parameters are updated element-wise, h can represent an element of the machine learning model 202. In Equation (3), $g(\theta_{sh}, T_{i+1})$ represents the gradients with respect to the shared learning parameters at layer or element h that is being trained on the new task $T_{1+1}$.

The continual learning optimization in Equation (3) causes the shared learning parameters to be updated smoothly, with the new task learning parameters being located close to the current learning parameters. Using a fixed learning rate can cause degradation of the learning process. Adjusting the learning rate (n) using the ratio of weights to gradients can thus provide for smart dynamic gating of neurons that triggers neuron activation while avoiding losing neurons entirely such as in existing dropout gating techniques. As an example, Tables 1 and 2 show sample test results over ten iterations of training after receiving a new task using a CIFAR100 dataset and an AWA dataset, respectively. In Table 1, Conv.x and FC.y represent the convolutional and fully-connected layers, where x and y represent the layer number. As the results in Table 1 demonstrate, the rate of updates changes layer-wise for different tasks, and it does not follow a fixed rate.

TABLE 1

$$r = \frac{\|\theta_t^h\|}{\|g(\theta_t^h)\|}, CIFAR100$$

| | Conv. 1 | Conv. 2 | Conv. 3 | Conv. 4 | Conv. 5 | FC. 6 | FC. 7 | FC. 8 |
|---|---|---|---|---|---|---|---|---|
| Task 1 | 8.53 | 29.86 | 118.67 | 153.42 | 59.17 | 988.63 | 389.27 | 37.43 |
| Task 2 | 44.21 | 9.12 | 52.34 | 79.81 | 194.37 | 627.39 | 836.54 | 127.14 |
| Task 3 | 123.48 | 47.29 | 34.83 | 210.39 | 69.71 | 342.59 | 663.72 | 181.58 |
| Task 4 | 9.74 | 16.27 | 51.37 | 127.49 | 67.48 | 427.11 | 638.26 | 79.25 |
| Task 5 | 141.43 | 62.85 | 41.54 | 192.38 | 322.58 | 1239.18 | 798.46 | 879.18 |

TABLE 2

$$r = \frac{\|\theta_t^h\|}{\|g(\theta_t^h)\|}, AWA$$

| | Conv. 1 | Conv. 2 | Conv. 3 | Conv. 4 | Conv. 5 | FC. 6 | FC. 7 | FC. 8 |
|---|---|---|---|---|---|---|---|---|
| Task 1 | 23.45 | 11.26 | 153.49 | 79.81 | 723.42 | 712.16 | 391.37 | 123.72 |
| Task 2 | 19.28 | 69.33 | 179.82 | 69.54 | 98.53 | 1011.67 | 1278.54 | 245.73 |
| Task 3 | 78.43 | 91.14 | 43.39 | 154.67 | 123.68 | 532.17 | 229.49 | 91.17 |
| Task 4 | 12.43 | 26.57 | 158.47 | 188.91 | 273.58 | 1023.49 | 280.62 | 261.34 |
| Task 5 | 178.61 | 189.15 | 53.76 | 242.38 | 321.43 | 649.62 | 12.46 | 89.48 |

As further shown in Table 1 using the CIFAR100 dataset, $r_{FC.6/Conv.1}$ represents that the FC.6 r value to the Conv.1 r value is about 116 in task 1, whereas this ratio ($r_{FC.6/Conv.1}$) is about 14 for task 2. For task 3, Conv.3 and FC.7 present the lowest and highest r-value among the layers. In contrast, the lowest and highest r-value of the layers are Conv. 1, FC.7 and Conv.3, FC.6 for tasks 4 and 5, respectively. As shown in Table 2, using the AWA dataset results in different r-values for different layers and tasks. For example, the layers Conv.1 and FC.7 present the smallest and largest r-value for task 2, while the layers Conv.2 and FC.6 have the smallest and largest r-value for task 1. The results in Tables 1 and 2 show that the values of $\|\theta\|$ and $\|g(\theta)\|$ can differ significantly for different layers. When $\|g(\theta)\|$ is small, a larger learning rate will help in accelerating the training. In contrast, a smaller learning rate can help when $\|g(\theta)\|$ is large to mitigate divergence and also helps with leading the direction to flat local minima rather than sharp local minima.

Particularly, when a new task $T_{i+1}$ arrives after the machine learning model 202 is trained on task $T_i$, the dynamic learning rate regularizes the update for the learning parameters of every layer. This results in creating new gates by either enabling or disabling neurons. The shared learning parameters are updated along a direction opposite the direction of the gradients with a step length proportional to the norm of the learning parameters. This can be seen from Equation (3), where $$\frac{g(\theta_{sh}^h, T_{i+1})}{\|g(\theta_{sh}^h, T_{i+1})\|}$$

is a unit vector. The step length thus equals $$n * \|\theta_{sh}^s\|.$$

When the norm of shared learning parameters is close to zero (inactive neurons), the step length is close to zero, and the learning parameters close to zero get stuck, gating the parameters. Additionally, the step length applies smooth updates on active neurons considering the normalized gradient values, causing the shared learning parameters to be updated smoothly, causing the new task learning parameters to be located close to the current learning parameters, and causing the curvature to be directed to flat local minima.

The process 400 provides various benefits for continual learning frameworks depending on the implementation. These benefits can include a smart gating mechanism based on a current learning rate and a new task gradient update. The gating mechanism has enough plasticity to learn new tasks and is stable enough to preserve the knowledge from previously learned tasks. These benefits can also include that the process 400 may force the neurons to be either active or deactivated, resulting in learning new tasks with fewer learning parameters and reducing interdependent learning among the neurons. These benefits can further include that the adaptive learning rate may affect the semi-active neurons more than active or inactive neurons, resulting in preserving task-specific pathways when learning consecutive tasks. In addition, these benefits can include that the dynamic learning rate may update the learning parameters smoothly and further lead the learning convergence to flat local minima rather than sharp local minima, resulting in more accurate generalization.

As an example, as shown in Table 3 below, the CRN method provides for flatter local minima with respect to other methods, with lower sharpness values representing more flatness.

TABLE 3

| Sharpness value considering $\in = 10^{-3}$ and $\in = 5.10^{-4}$ | | | | |
|---|---|---|---|---|
| | CIFAR-100 | AWA | CIFAR-100 | AWA |
| Methods: | $\in = 10^{-3}$ | | $\in = 5.10^{-4}$ | |
| OGD | 43.2 ± 7.84 | 64.21 ± 4.26 | 12.34 ± 2.56 | 22.89 ± 3.89 |
| A-GEM | 68.78 ± 6.67 | 89.56 ± 5.64 | 31.43 ± 1.67 | 29.12 ± 5.61 |
| EWC | 175.45 ± 12.45 | 112.73 ± 15.34 | 67.49 ± 5.23 | 47.87 ± 8.13 |
| DEN | 51.56 ± 9.87 | 55.67 ± 6.27 | 21.59 ± 4.31 | 15.81 ± 3.64 |
| APD | 77.80 ± 8.43 | 57.81 ± 8.29 | 37.6 ± 8.47 | 17.94 ± 4.31 |
| RSPN | 73.26 ± 7.59 | 85.16 ± 7.63 | 35.47 ± 4.74 | 26.72 ± 2.78 |
| SSGD | 49.96 ± 6.94 | 52.46 ± 8.67 | 15.23 ± 3.46 | 21.36 ± 3.89 |
| SGD | 412.45 ± 34.66 | 376.59 ± 29.53 | 114.54 ± 12.54 | 109.84 ± 13.24 |
| DER | 47.52 ± 8.59 | 68.37 ± 2.3 | 15.37 ± 6.73 | 24.69 ± 3.42 |
| MEGA | 50.38 ± 5.73 | 76.49 ± 4.67 | 19.64 ± 2.2 | 27.1 ± 3.65 |
| $CO^2L$ | 47.50 ± 4.85 | 82.78 ± 3.95 | 15.3 ± 2.6 | 27.1 ± 3.65 |
| CRN | 35.7 ± 3.94 | 49.34 ± 6.24 | 8.67 ± 0.85 | 12.42 ± 0.76 |

At step 408 of the process 400, for each new task learned, the machine learning model 202 provides one or more outputs based on the type of task. The output(s) can be presented to a user of an electronic device 101, or the electronic device 101 could use the output(s) to instruct another function of the electronic device 101 or another electronic device. For example, the process 400 can be used to continuously update a machine learning model 202 for an AI voice assistant to learn personalized or private utterances in new domains and output commands for actions in those domains. As another example, the process 400 can be used to continuously update a machine learning model 202 for object recognition.

As a particular example, the machine learning model 202 could be deployed on edge devices such as smartphones or smartglasses. As the devices are moved around, a camera could record different objects and learn the different objects over time on different domains. For example, the machine learning model 202 may be trained on a first task to detect that an image includes a dog, then a subsequent task to detect that an image includes a cat, then a subsequent task to detect that an image includes a lion, then a subsequent task to detect that an image includes a tiger, and so on, retaining the knowledge learned from each previous task. It will be understood that various object types could be learned for detection in this way.

Although FIG. 4 illustrates one example of a continuous learning process 400, various changes may be made to FIG. 4. For example, although the process 400 is described above as using SGD, the continual training of the process 400 can be applied using other optimizations methods or functions without departing from the scope of this disclosure. The process 400 may also be performed using a distributed architecture. For instance, the machine learning model 202 can be executed and continuously trained on a client electronic device (such as electronic device 101) or at a server (such as server 106), with inputs and/or outputs being received by or transmitted to a remote electronic device.

Figure 6:
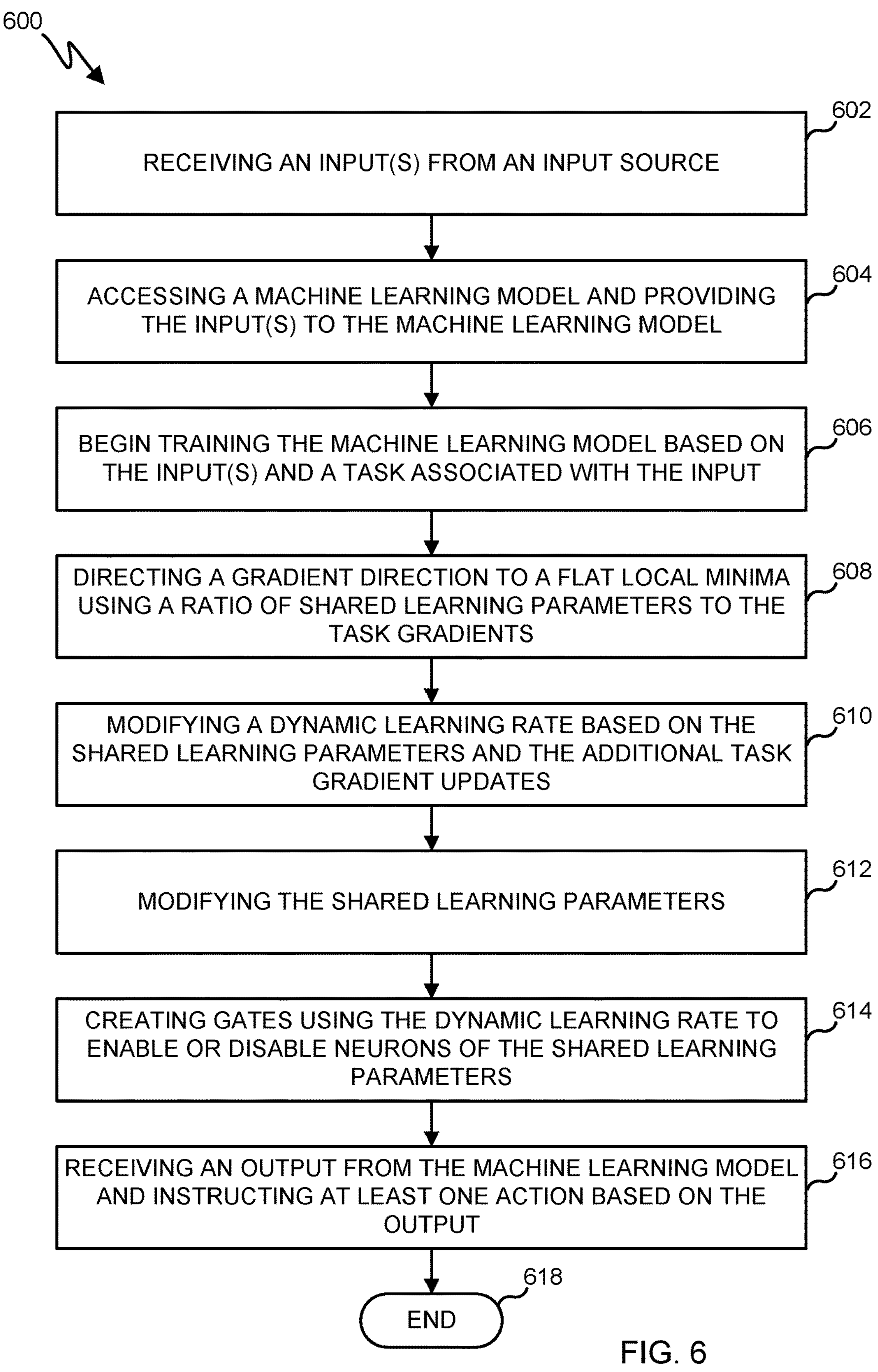
FIG. 6 illustrates an example method for continual refinable machine learning in accordance with embodiments of this disclosure.

FIG. 6 illustrates an example method 600 for continual refinable machine learning in accordance with embodiments of this disclosure. For ease of explanation, the method 600 shown in FIG. 6 is described as being performed using the electronic device 101 in the network configuration 100 of FIG. 1. However, the method 600 may be used with any other suitable device(s), such as the server 106, and in any other suitable system(s).

At block 602, the processor 120 receives one or more inputs (such as audio data, image data, or other data) from an input source (such as a camera, an audio input device, a keyboard, etc.). At block 604, the processor 120 accesses a machine learning model 202 and provides the input(s) to the machine learning model 202. The machine learning model 202 is trained in the method 600 for various continuous learning tasks by directing a gradient direction of gradients to one or more flat local minima and using a dynamic learning rate for one or more additional tasks as described in this disclosure, such as with respect to FIG. 4.

At block 606, the processor 120 begins training the machine learning model 202 based on the input(s) and a task associated with the input(s). The training of the machine learning model 202 includes, at block 608, directing the gradient direction to the one or more flat local minima using a ratio of shared learning parameters to additional task gradient updates. At block 610, the processor 120 modifies a learning rate based on the shared learning parameters and the additional task gradient updates. At block 612, the processor 120 modifies the shared learning parameters based on the ratio and modified learning rate as described in this disclosure, such as with respect to FIG. 4. In some embodiments, modifying the shared learning parameters includes updating the shared learning parameters along a direction opposite the gradient direction using the modified learning rate. Also, in some embodiments, the dynamic learning rate is modified layer-wise or element-wise. In addition, in some embodiments, the modified dynamic learning rate includes a step length proportional to a norm of the shared learning parameters as described in this disclosure, such as with respect to FIG. 4.

At block 614, the processor 120 creates gates in the machine learning model 202 based on using the dynamic learning rate in order to update the shared parameters of the machine learning model 202. In embodiments of this disclosure, the gates are created by either enabling or disabling neurons of the shared learning parameters. This smart gating mechanism based on a current learning rate and a new task gradient update has a degree of plasticity that enables the machine learning model 202 to learn new tasks and is stable enough to preserve the knowledge from previously learned tasks. Enabling or disabling neurons results in learning new tasks with fewer learning parameters and reducing interdependent learning among the neurons. The adaptive learning rate affects the semi-active neurons more than active or inactive neurons resulting in preserving task-specific pathways when learning consecutive tasks. Using the dynamic learning rate also assists with updating the learning parameters smoothly and further leads the learning convergence to flat local minima rather than sharp local minima, resulting in more accurate generalization.

At block 616, the machine learning model 202 provides one or more outputs based on the type of task. The output(s) can be presented to a user of an electronic device 101, or the electronic device 101 could use the output(s) to instruct one or more other functions of the electronic device 101 or another electronic device. The processor 120 can continuously update a machine learning model 202 for an AI voice assistant to learn personalized or private utterances in new domains and output commands for actions in those domains. As another example, the processor 120 can continuously update a machine learning model 202 for object recognition. For instance, the machine learning model 202 could be deployed on edge devices, such as smartphones or smartglasses. As the devices are moved around, cameras could record different objects and learn the different objects over time on different domains. For example, the machine learning model 202 may be trained on a first task to detect that an image includes a dog, then a subsequent task to detect that an image includes a cat, then a subsequent task to detect that an image includes a lion, then a subsequent task to detect that an image includes a tiger, and so on, retaining the knowledge learned from the previous tasks. It will be understood that various object types could be learned for detection in this way.

Although FIG. 6 illustrates one example of a method 600 for continual refinable machine learning, various changes may be made to FIG. 6. For example, while shown as a series of steps, various steps in FIG. 6 could overlap, occur in parallel, occur in a different order, or occur any number of times. As a particular example, although shown as separate steps in blocks 608-612, as described in this disclosure such as with respect to the optimization function shown as Equation (3), the acts of directing the gradient direction to flat local minima, modifying the dynamic learning rate, and updating the shared learning parameters can be practically performed as a single update step using the optimization function.

Although this disclosure has been described with example embodiments, various changes and modifications may be suggested to one skilled in the art. It is intended that this disclosure encompass such changes and modifications as fall within the scope of the appended claims.

What is claimed is:

1. A method comprising:

accessing, using at least one processor of an electronic device, a machine learning model, wherein the machine learning model includes a plurality of layers of shared learning parameters, wherein the machine learning model is initially trained on an initial task, and wherein the machine learning model is further trained on one or more additional tasks by directing a gradient direction of gradients for each of the one or more additional tasks to one or more flat local minima using a ratio of the shared learning parameters to additional task gradient updates, and updating the shared learning parameters by modifying a dynamic learning rate for each of the one or more additional tasks and by modifying the shared learning parameters based on the ratio;

receiving, using the at least one processor, an input from an input source;

providing, using the at least one processor, the input to the machine learning model;

receiving, using the at least one processor, an output from the machine learning model; and instructing, using the at least one processor, at least one action based on the output from the machine learning model.

2. The method of claim 1, wherein modifying the shared learning parameters based on the ratio includes updating the shared learning parameters along a direction opposite the gradient direction.

3. The method of claim 2, wherein training the machine learning model further includes modifying the dynamic learning rate for each of the one or more additional tasks based on the shared learning parameters and the additional task gradient updates.

4. The method of claim 3, wherein the modified dynamic learning rate includes a step length proportional to a norm of the shared learning parameters.

5. The method of claim 4, wherein training the machine learning model further includes using the dynamic learning rate to create gates by activating or disactivating neurons of the shared learning parameters.

6. The method of claim 5, wherein creating the gates results in learning the additional tasks with fewer learning parameters.

7. The method of claim 3, wherein the dynamic learning rate is modified layer-wise or element-wise.

8. An apparatus comprising:

at least one processing device configured to:

access a machine learning model, wherein the machine learning model includes a plurality of layers of shared learning parameters, wherein the machine learning model is initially trained on an initial task, and wherein the machine learning model is further trained on one or more additional tasks by directing a gradient direction of gradients for each of the one or more additional tasks to one or more flat local minima using a ratio of the shared learning parameters to additional task gradient updates, and updating the shared learning parameters by modifying a dynamic learning rate for each of the one or more additional tasks and by modifying the shared learning parameters based on the ratio;

receive an input from an input source;

provide the input to the machine learning model;

receive an output from the machine learning model; and instruct at least one action based on the output from the machine learning model.

9. The apparatus of claim 8, wherein, to modify the shared learning parameters based on the ratio, the at least one processing device is configured to update the shared learning parameters along a direction opposite the gradient direction.

10. The apparatus of claim 9, wherein, to train the machine learning model, the at least one processing device is configured to modify the dynamic learning rate for each of the one or more additional tasks based on the shared learning parameters and the additional task gradient updates.

11. The apparatus of claim 10, wherein the modified dynamic learning rate includes a step length proportional to a norm of the shared learning parameters.

12. The apparatus of claim 11, wherein, to train the machine learning model, the at least one processing device is configured to use the dynamic learning rate to create gates by activating or disactivating neurons of the shared learning parameters.

13. The apparatus of claim 12, wherein creation of the gates results in learning the additional tasks with fewer learning parameters.

14. The apparatus of claim 10, wherein the dynamic learning rate is modified layer-wise or element-wise.

15. A non-transitory computer readable medium containing instructions that when executed cause at least one processor to:

access a machine learning model, wherein the machine learning model includes a plurality of layers of shared learning parameters, wherein the machine learning model is initially trained on an initial task, and wherein the machine learning model is further trained on one or more additional tasks by directing a gradient direction of gradients for each of the one or more additional tasks to one or more flat local minima using a ratio of the shared learning parameters to additional task gradient updates, and updating the shared learning parameters by modifying a dynamic learning rate for each of the one or more additional tasks and by modifying the shared learning parameters based on the ratio;

receive an input from an input source;

provide the input to the machine learning model;

receive an output from the machine learning model; and instruct at least one action based on the output from the machine learning model.

16. The non-transitory computer readable medium of claim 15, wherein the instructions that when executed cause the at least one processor to modify the shared learning parameters based on the ratio comprise:

instructions that when executed cause the at least one processor to update the shared learning parameters along a direction opposite the gradient direction.

17. The non-transitory computer readable medium of claim 16, wherein the instructions that when executed cause the at least one processor to train the machine learning model comprise:

instructions that when executed cause the at least one processor to modify the dynamic learning rate for each of the one or more additional tasks based on the shared learning parameters and the additional task gradient updates.

* * * * *